United States Patent
Sato

(10) Patent No.: US 9,747,060 B2
(45) Date of Patent: Aug. 29, 2017

(54) INFORMATION PROCESSING APPARATUS, INFORMATION PROCESSING METHOD, AND COMPUTER PROGRAM PRODUCT

(71) Applicant: Nobuyuki Sato, Kanagawa (JP)

(72) Inventor: Nobuyuki Sato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/951,735

(22) Filed: Nov. 25, 2015

(65) Prior Publication Data

US 2016/0154611 A1   Jun. 2, 2016

(30) Foreign Application Priority Data

Dec. 1, 2014  (JP) .................................. 2014-243528
Oct. 30, 2015 (JP) .................................. 2015-214067

(51) Int. Cl.
  *G06F 3/12*   (2006.01)
(52) U.S. Cl.
  CPC .......... *G06F 3/1204* (2013.01); *G06F 3/1263* (2013.01); *G06F 3/1285* (2013.01)
(58) Field of Classification Search
  CPC ..... G06F 3/1204; G06F 3/1285; G06F 3/1263
  USPC ....................................................... 358/1.15
  See application file for complete search history.

(56) References Cited

U.S. PATENT DOCUMENTS

| 5,669,040 A | 9/1997 | Hisatake |
| 2004/0107127 A1* | 6/2004 | Kanzinger ....... G06Q 10/06311 705/7.15 |
| 2008/0297839 A1* | 12/2008 | Kayama ................ G06F 3/1204 358/1.15 |
| 2016/0127645 A1* | 5/2016 | Sudo .................. H04N 5/23245 348/221.1 |

FOREIGN PATENT DOCUMENTS

| JP | 3016505 | 12/1999 |
| JP | 2010-206645 | 9/2010 |

* cited by examiner

*Primary Examiner* — Kent Yip
(74) *Attorney, Agent, or Firm* — Cooper & Dunham LLP

(57) ABSTRACT

An information processing apparatus includes a storage unit, a display controller, an input receiver, a job management unit, and a sorting unit. The display controller performs control to display, on a display unit, a job list that is a list of one or more jobs and contains one or more setting items for each job. The input receiver receives selection of a setting item from the list. The job management unit stores, in the storage unit, arrangement orders of setting values of the setting items on the list when selection of the setting item is received. The sorting unit rearranges the jobs such that the setting values of the selected setting item are arranged in a predetermined order while keeping arrangement orders of the setting values of the setting items other than the selected setting item among the jobs in ascending or descending order as stored in the storage unit.

6 Claims, 14 Drawing Sheets

FIG.3

| Job Name | User Name | Size | Pages | Copies | Date/Time | ... | |
|---|---|---|---|---|---|---|---|
| Dog | Kyle | Letter | 1 | 1 | 10/10/2014 9:24:12 AM | | |
| Cat | Mike | Letter | 1 | 1 | 10/9/2014 3:39:19 PM | | |
| Salmon | Ron | Letter | 3 | 2 | 10/9/2014 3:32:00 PM | | |
| Fox | Ron | Letter | 1 | 1 | 10/8/2014 3:46:06 PM | | |
| Cat | Ken | Letter | 1 | 5 | 10/3/2014 4:36:10 PM | | |
| Bear | Ken | Letter | 1 | 1 | 10/3/2014 4:36:09 PM | | |
| Monkey | Ken | Letter | 1 | 1 | 10/3/2014 4:36:09 PM | | |
| Rabbit | Mike | Letter | 1 | 4 | 10/3/2014 11:05:56 AM | | |
| Bat | Mike | Letter | 1 | 1 | 10/3/2014 11:05:15 AM | | |
| Cat | Vivian | Letter | 1 | 1 | 9/25/2014 10:03:04 AM | | |
| Dog | Mike | Letter | 1 | 1 | 9/24/2014 11:40:14 AM | | |
| Squirrel | Tanaka | Letter | 1 | 1 | 9/18/2014 12:53:02 PM | | |
| Horse | Mike | Letter | 2 | 1 | 9/18/2014 12:52:28 PM | | |
| Deer | Vivian | Letter | 1 | 2 | 9/18/2014 12:52:08 PM | | |
| Tiger | Vivian | Letter | 1 | 2 | 9/18/2014 9:25:54 AM | | |
| Elephant | Tanaka | Letter | 1 | 1 | 9/10/2014 3:19:53 PM | | |
| Cat | Ron | Letter | 1 | 1 | 9/9/2014 11:34:02 AM | | |

FIG.6

| Job Name | User Name | Size | Pages | Copies | Date/Time | ... | |
|---|---|---|---|---|---|---|---|
| Bat | Mike | Letter | 1 | 1 | 10/3/2014 11:05:15 AM | | |
| Bear | Ken | Letter | 1 | 1 | 10/3/2014 4:36:09 PM | | |
| Cat | Mike | Letter | 1 | 1 | 10/9/2014 3:39:19 PM | | |
| Cat | Ken | Letter | 1 | 5 | 10/3/2014 4:36:10 PM | | |
| Cat | Vivian | Letter | 1 | 1 | 9/25/2014 10:03:04 AM | | |
| Cat | Ron | Letter | 1 | 1 | 9/9/2014 11:34:02 AM | | |
| Deer | Vivian | Letter | 1 | 2 | 9/18/2014 12:52:08 PM | | |
| Dog | Kyle | Letter | 1 | 1 | 10/10/2014 9:24:12 AM | | |
| Dog | Mike | Letter | 1 | 1 | 9/24/2014 11:40:14 AM | | |
| Elephant | Tanaka | Letter | 1 | 1 | 9/10/2014 3:19:53 PM | | |
| Fox | Ron | Letter | 1 | 1 | 10/8/2014 3:46:06 PM | | |
| Horse | Mike | Letter | 2 | 1 | 9/18/2014 12:52:28 PM | | |
| Monkey | Ken | Letter | 1 | 1 | 10/3/2014 4:36:09 PM | | |
| Rabbit | Mike | Letter | 1 | 4 | 10/3/2014 11:05:56 AM | | |
| Salmon | Ron | Letter | 3 | 2 | 10/9/2014 3:32:00 PM | | |
| Squirrel | Tanaka | Letter | 1 | 1 | 9/18/2014 12:53:02 PM | | |
| Tiger | Vivian | Letter | 1 | 2 | 9/18/2014 9:25:54 AM | | |

FIG.7

| Job Name | User Name | Size | Pages | Copies | Date/Time | ... | |
|---|---|---|---|---|---|---|---|
| Cat | Ken | Letter | 1 | 5 | 10/3/2014 4:36:10 PM | | |
| Bear | Ken | Letter | 1 | 1 | 10/3/2014 4:36:09 PM | | |
| Monkey | Ken | Letter | 1 | 1 | 10/3/2014 4:36:09 PM | | |
| Dog | Kyle | Letter | 1 | 1 | 10/10/2014 9:24:12 AM | | |
| Cat | Mike | Letter | 1 | 1 | 10/9/2014 3:39:19 PM | | |
| Rabbit | Mike | Letter | 1 | 4 | 10/3/2014 11:05:56 AM | | |
| Bat | Mike | Letter | 1 | 1 | 10/3/2014 11:05:15 AM | | |
| Dog | Mike | Letter | 1 | 1 | 9/24/2014 11:40:14 AM | | |
| Horse | Mike | Letter | 2 | 1 | 9/18/2014 12:52:28 PM | | |
| Salmon | Ron | Letter | 3 | 2 | 10/9/2014 3:32:00 PM | | |
| Fox | Ron | Letter | 1 | 1 | 10/8/2014 3:46:06 PM | | |
| Cat | Ron | Letter | 1 | 1 | 9/9/2014 11:34:02 AM | | |
| Squirrel | Tanaka | Letter | 1 | 1 | 9/18/2014 12:53:02 PM | | |
| Elephant | Tanaka | Letter | 1 | 1 | 9/10/2014 3:19:53 PM | | |
| Cat | Vivian | Letter | 1 | 1 | 9/25/2014 10:03:04 AM | | |
| Deer | Vivian | Letter | 1 | 2 | 9/18/2014 12:52:08 PM | | |
| Tiger | Vivian | Letter | 1 | 2 | 9/18/2014 9:25:54 AM | | |

FIG.8

| Job Name | User Name | Size | Pages | Copies | Date/Time | ... | |
|---|---|---|---|---|---|---|---|
| Bat | Mike | Letter | 1 | 1 | 10/3/2014 11:05:15 AM | | |
| Bear | Ken | Letter | 1 | 1 | 10/3/2014 4:36:09 PM | | |
| Cat | Ken | Letter | 1 | 5 | 10/3/2014 4:36:10 PM | | |
| Cat | Mike | Letter | 1 | 1 | 10/9/2014 3:39:19 PM | | |
| Cat | Ron | Letter | 1 | 1 | 9/9/2014 11:34:02 AM | | |
| Cat | Vivian | Letter | 1 | 1 | 9/25/2014 10:03:04 AM | | |
| Deer | Vivian | Letter | 1 | 2 | 9/18/2014 12:52:08 PM | | |
| Dog | Kyle | Letter | 1 | 1 | 10/10/2014 9:24:12 AM | | |
| Dog | Mike | Letter | 1 | 1 | 9/24/2014 11:40:14 AM | | |
| Elephant | Tanaka | Letter | 1 | 1 | 9/10/2014 3:19:53 PM | | |
| Fox | Ron | Letter | 1 | 1 | 10/8/2014 3:46:06 PM | | |
| Horse | Mike | Letter | 2 | 1 | 9/18/2014 12:52:28 PM | | |
| Monkey | Ken | Letter | 1 | 1 | 10/3/2014 4:36:09 PM | | |
| Rabbit | Mike | Letter | 1 | 4 | 10/3/2014 11:05:56 AM | | |
| Salmon | Ron | Letter | 3 | 2 | 10/9/2014 3:32:00 PM | | |
| Squirrel | Tanaka | Letter | 1 | 1 | 9/18/2014 12:53:02 PM | | |
| Tiger | Vivian | Letter | 1 | 2 | 9/18/2014 9:25:54 AM | | |

FIG.9

| Job Name | User Name | Pages | Copies | Date/Time | Sort | ... |
|---|---|---|---|---|---|---|
| Dog | Kyle | 1 | 1 | 10/10/2014 9:24:12 AM | | |
| Cat | Mike | 1 | 1 | 10/9/2014 3:39:19 PM | | |
| Salmon | Ron | 3 | 2 | 10/9/2014 3:32:00 PM | | |
| Fox | Ron | 1 | 1 | 10/8/2014 3:46:06 PM | | |
| Cat | Ken | 1 | 5 | 10/3/2014 4:36:10 PM | | |
| Bear | Ken | 1 | 1 | 10/3/2014 4:36:09 PM | | |
| Monkey | Ken | 1 | 1 | 10/3/2014 4:36:09 PM | | |
| Rabbit | Mike | 1 | 4 | 10/3/2014 11:05:56 AM | | |
| Bat | Mike | 1 | 1 | 10/3/2014 11:05:15 AM | | |
| Cat | Vivian | 1 | 1 | 9/25/2014 10:03:04 AM | | |
| Dog | Mike | 1 | 1 | 9/24/2014 11:40:14 AM | | |
| Squirrel | Tanaka | 1 | 1 | 9/18/2014 12:53:02 PM | | |
| Horse | Mike | 2 | 1 | 9/18/2014 12:52:28 PM | | |
| Deer | Vivian | 1 | 2 | 9/18/2014 12:52:08 PM | | |
| Tiger | Vivian | 1 | 2 | 9/18/2014 9:25:54 AM | | |
| Elephant | Tanaka | 1 | 1 | 9/10/2014 3:19:53 PM | | |
| Cat | Ron | 1 | 1 | 9/9/2014 11:34:02 AM | | |

M2:
✔ Job Name
✔ User Name
  Size
✔ Pages
✔ Copies
✔ Date/Time
  ⋮
  more... ▶
  sort... ▶

M3:
Job Name
User Name
Size
Pages
Copies
Date/Time
⋮
more... ▶

FIG.15

| Job Name | User Name | Pages | Copies | Date/Time | ... | |
|---|---|---|---|---|---|---|
| Dog | Kyle | 1 | 1 | 10/10/2014 9:24:12 AM | | |
| Cat | Mike | 1 | 1 | | PM | |
| Salmon | Ron | 3 | 2 | | PM | |
| Fox | Ron | 1 | 1 | | PM | |
| Cat | Ken | 1 | 5 | | PM | |
| Bear | Ken | 1 | 1 | | PM | |
| Monkey | Ken | 1 | 1 | | | |
| Rabbit | Mike | 1 | 4 | 10/3/2014 11:05: | | |
| Bat | Mike | 1 | 1 | 10/3/2014 11:05: | | |
| Cat | Vivian | 1 | 1 | 9/25/2014 10:03:( | | |
| Dog | Mike | 1 | 1 | 9/24/2014 11:40:14 AM | | |
| Squirrel | Tanaka | 1 | 1 | 9/18/2014 12:53:02 PM | | |
| Horse | Mike | 2 | 1 | 9/18/2014 12:52:28 PM | | |
| Deer | Vivian | 1 | 2 | 9/18/2014 12:52:08 PM | | |
| Tiger | Vivian | 1 | 2 | 9/18/2014 9:25:54 AM | | |
| Elephant | Tanaka | 1 | 1 | 9/10/2014 3:19:53 PM | | |
| Cat | Ron | 1 | 1 | 9/9/2014 11:34:02 AM | | |

Popup (M1):
✔ Job Name
✔ User Name
  Size
✔ Pages
✔ Copies
✔ Date/Time
⋮
more... ▶

Submenu:
Color ▶
Image ▶
Layout ▶
Finishing ▶
⋮

Submenu:
Color mode
✔ Combine separations
Rendering intent
⋮

INFORMATION PROCESSING APPARATUS, INFORMATION PROCESSING METHOD, AND COMPUTER PROGRAM PRODUCT

CROSS-REFERENCE TO RELATED APPLICATION

The present application claims priority to and incorporates by reference the entire contents of Japanese Patent Application No. 2014-243528 filed in Japan on Dec. 1, 2014, and Japanese Patent Application No. 2015-214067 filed in Japan on Oct. 30, 2015.

BACKGROUND OF THE INVENTION

1. Field of the Invention

The present invention relates to an information processing apparatus, an information processing method, and a computer program product.

2. Description of the Related Art

In recent years, in a product printing field as what is called the printing industry, small-lot and diversified printing has been mainstream rather than offset mass printing. In this tendency, as for printing machines, electrophotography and ink jet on-demand printing machines suitable for on-demand printing have been used more frequently than conventional offset printing machines. When the diversified printing is controlled in the on-demand printing machines, job management by a print server is important.

In the small-lot and diversified printing, a period to the deadline is extremely short in many cases. In these cases, it has been common practice to print a corresponding job between other jobs by an on-demand printing machine during printing using an interruption printing function or the like of a print server while considering the deadlines of other print matters. Furthermore, when the print job for which the interruption printing is performed is not newly printed but reprinted, time for raster image processor (RIP) processing can be saved by executing printing of a raster image of a previous job remaining in a print queue again rather than execution of the RIP processing by importing a job newly.

For example, Japanese Patent No. 3016505 discloses an image formation apparatus capable of performing the above-mentioned interruption printing because the image formation apparatus has a job list display function so as to enable job selection and setting change to be performed on a job list. The image formation apparatus as disclosed in Japanese Patent No. 3016505 is also effective when printing should be performed while changing setting little by little for color matching in proof printing or other reasons.

Recent print servers (for example, Fiery (registered trademark) server manufactured by Electronics for Imaging, Inc.) can focus on a certain setting item and sort (rearrange) setting values of the focused setting item in addition to the job list display function. With this function, a job that is desired to be printed is easy to find among a large number of jobs by selecting a job name (setting item), for example, for sorting. It is apparent that sorting can be performed by setting items other than the job name and a desired job can be found by sorting the jobs by a setting item such as a user name and a print paper size of the job. A user can also freely change the setting items that are displayed on the job list.

In the recent printing industry, a plurality of jobs are collectively printed with the same setting in some cases. In this case, even conventional print servers sort a large number of jobs displayed on a job list by a certain setting item such as a job name and specify a job for instruction of setting change or reprinting. It is however difficult to specify a desired job when a large number of other jobs with similar job names or similar settings are displayed, resulting in a complicated operation.

Therefore, there is a need for an information processing apparatus, an information processing method, and a computer program product that are capable of specifying a desired job easily and improving convenience.

SUMMARY OF THE INVENTION

It is an object of the present invention to at least partially solve the problems in the conventional technology.

According to an embodiment, an information processing apparatus is connected to an image formation apparatus through a network and includes a storage unit, a display controller, an input receiver, a job management unit, and a sorting unit. The display controller performs control to display, on a display unit, a job list that is a list of one or more jobs executable in the image formation apparatus and contains one or more setting items for each of the jobs. The input receiver receives selection of a setting item from the displayed job list. The job management unit stores, in the storage unit, arrangement orders of setting values of the setting items on the displayed job list when selection of the setting item is received. The sorting unit rearranges the jobs such that the setting values of the selected setting item are arranged in a predetermined order while keeping arrangement orders of the setting values of the setting items other than the selected setting item among the jobs in ascending or descending order as stored in the storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of a job list that is displayed on the PC in the first embodiment;

FIG. 6 is a diagram illustrating an example of a job list sorted by "job Name (job name)";

FIG. 7 is a diagram illustrating an example of a job list sorted by "User Name (user name)";

FIG. 8 is a diagram illustrating an example of a job list sorted by "User Name (user name)" and "Job Name (job name)";

FIG. 9 is a diagram illustrating an example of a job list that is displayed on a PC according to a second embodiment;

FIG. 15 is a diagram illustrating an example of a job list that is displayed on the conventional PC.

DETAILED DESCRIPTION OF THE PREFERRED EMBODIMENTS

Hereinafter, embodiments will be described in detail with reference to the accompanying drawings.

First Embodiment

Figure 1:
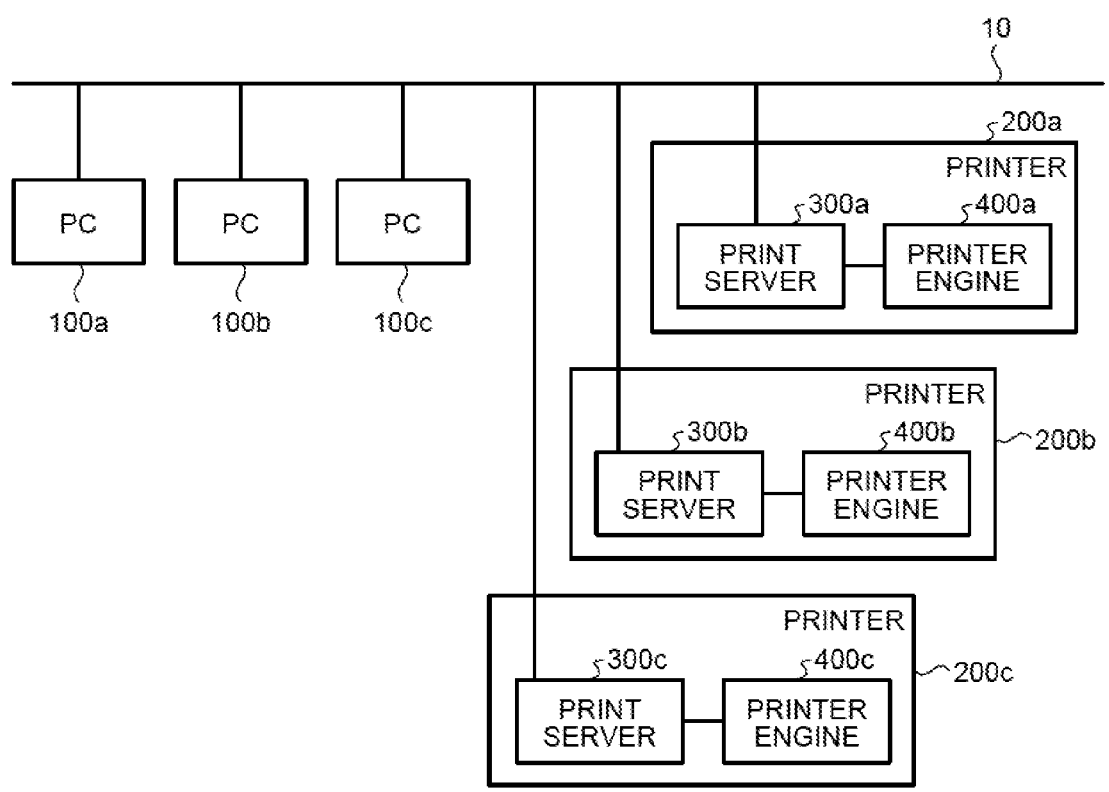
FIG. 1 is a diagram illustrating the entire configuration of an image formation system according to a first embodiment.

FIG. 1 is a diagram illustrating the entire configuration of an image formation system according to a first embodiment. As illustrated in FIG. 1, in the image formation system in the present embodiment, personal computers (PC) 100a, 100b, and 100c (100a to 100c) and printers 200a, 200b, and 200c (200a to 200c) are connected to each other through a network 10. A public network, a company network, or the like can be applied to the network 10. For example, the network 10 is a telephone network, a wireless network, the Internet, or the like. The printers 200a to 200c include print servers 300a to 300c and printer engines 400a to 400c, respectively.

FIG. 1 illustrates an example of the image formation system in which three PCs and three printers are connected. Arbitrary numbers equal to or more than one PC and printer can be connected. Hereinafter, when explanation is applied to all of the PCs 100a to 100c or the printers 200a to 200c in a non-specified manner, the explanation is made while referring to as a PC 100, a printer 200, a print server 300, or a printer engine 400 simply. It should be noted that the PC 100 corresponds to an information processing apparatus in the present invention and the printer 200 corresponds to an image formation apparatus in the present invention.

The PC 100 generates print data and a print job for printing and transmits the generated data and job to the printer 200 through the network 10. When the PC 100 receives a print instruction as a print execution request from a user, the PC 100 transmits the received print instruction to the printer 200. The PC 100 includes a printer driver generating the print job, client software managing the print job, and the like.

When the print server 300 receives the print data and other data from the PC 100, the print server 300 performs data decompression and image processing on the received print data. Thereafter, when the print server 300 receives the print instruction from the PC 100, the print server 300 issues a print instruction to the printer engine 400 and transmits the print data on which the image processing and other processing have been performed to the printer engine 400.

Upon receiving the print instruction and the print data from the print server 300, the printer engine 400 prints the received print data. The printer engine 400 can be a color machine, a monochrome machine, or the like depending on colors to be printed, and can employ an electrophotography system, an ink jet system, or the like as a print method. In the image formation system in the present embodiment, any printer engine can be applied regardless of types thereof particularly. The case where the printer engine 400 is applied to a color electrophotography system will be described below, as an example.

In the image formation system, when the PC 100 transmits the print data to the print server 300, the print server 300 once accumulates the received print data. When the PC 100 transmits the print instruction to the print server 300, the print server 300 causes the printer engine 400 to print the print data.

In the image formation system, when the PC 100 displays a job list as a list of print jobs and receives selection of a print job by the user, the printer 200 can perform print setting change and reprinting. In the selection of the print job, when the number of print jobs that are displayed on the to list is large, it is difficult to find a desired print job. In order to overcome the difficulty, the PC 100 in the present embodiment has a function of sorting (rearranging) contents of the job list so that the user can find the desired print job easily.

Figure 2:
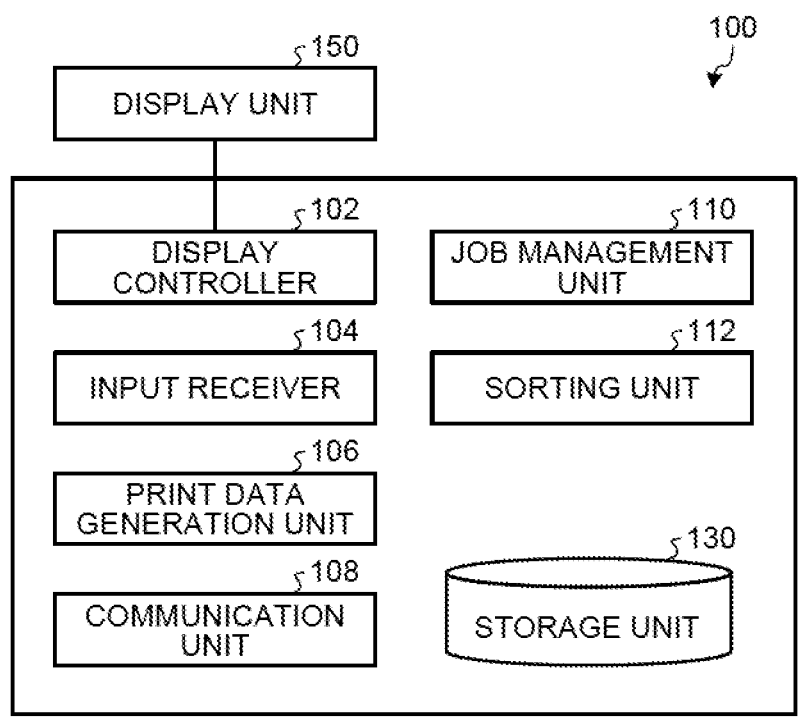
FIG. 2 is a diagram illustrating the functional configuration of a personal computer (PC) in the first embodiment.

Next, the configuration of the PC 100 will be described. FIG. 2 is a diagram illustrating the functional configuration of the PC in the first embodiment. As illustrated in FIG. 2, the PC 100 mainly includes a storage unit 130, a display controller 102, an input receiver 104, a print data generation unit 106, a communication unit 108, a job management unit 110, and a sorting unit 112.

The storage unit 130 is a storage medium storing therein pieces of data of various types such as image data that is desired to be printed, screens of various types, print jobs, and a job list as a list of the print jobs, and is a hard disk drive (HDD) or a memory, for example. The job list in the present embodiment is a list of one or more print jobs executable in the printer 200 and contains one or more setting items for each of the print jobs.

The display controller 102 performs control to display pieces of data of various types on a display unit 150 such as a display. In the present embodiment, the display controller 102 performs control to display, on the display unit 150, a setting screen for settings of printing and display and a print screen for printing.

The display controller 102 performs control to display a job list as a list of print jobs that are generated by the job management unit 110, for example, on the display unit 150. When the sorting unit. 112 sorts setting values of a selected setting item, the display controller 102 performs control to display a job list after sorted on the display unit 150.

Details of the "job list" will be described. FIG. 3 is a diagram illustrating an example of the job list that is displayed on the PC in the first embodiment. As illustrated in FIG. 3, on the job list in the present embodiment, "Job Name (job name)", "User Name (user name)", "Size (size)", "Pages (the number of pages)", "Copies (the number of print copies)", "Date/Time (date and time at which a print instruction has been issued)", and other items as setting items of print jobs are displayed and setting values are displayed for each of the setting items. For example, for the setting item of "Job Name", "Dog", "Cat", "Salmon", and other names as the setting values indicating the job names are arranged and displayed in order. For example, for the setting item of "User Name", "Kyle", "Mike", "Ron", and other names as the setting values indicating the user names are arranged and displayed in order. On the job list as illustrated in FIG. 3, the print jobs are arranged from top to bottom in the chronological order starting from the latest date and time at which the print instruction has been issued for the corresponding print job. That is to say, on the job list as illustrated in FIG. 3, the print jobs are arranged from top to bottom in descending order of the date and time at which the print instruction has been issued ("Date/Time").

When the display controller 102 performs control to display the job list on the display unit 150, the display controller 102 may also display "tray information". The tray information is information of paper accommodated in a tray of the printer engine 400, which is notified from the printer engine 400. Examples of contents that are displayed as the tray information include a paper type, a paper thickness, a paper size, and a remaining paper amount. With this display of the tray information, the user can select a desired print job and a desired setting item from the job list while grasping a state of the tray, and change the print setting.

The input receiver 104 receives input (selection) of various types from the user. In the present embodiment, when printing is to be executed, the input receiver 104 receives print setting by the user through the setting screen displayed on the display unit 150 and receives the print instruction as the print execution request through the print screen. It should be noted that the print setting can be also changed by clicking a setting button on a menu screen or displaying property with right-click, for example.

When the print setting change or the reprinting is to be executed, the input receiver 104 receives selection of the print job from the job list displayed on the display unit 150 by the user. When the setting values of the setting item are sorted, the input receiver 104 receives selection of the setting item from the job list by the user.

In the case where the sorting unit 112 sorts (rearranges) the setting values of the setting item, the input receiver 104 receives one of first sort setting and second sort setting as a setting manner (method) of this sorting. The first sort setting is setting of rearranging the print jobs while keeping the arrangement orders of the setting values of the individual setting items other than the selected setting item among the jobs in ascending or descending order before sorting, in the case where the setting values of the selected setting item on the job list are sorted. By contrast, the second sort setting is setting of rearranging the print jobs without keeping the arrangement orders of the setting values of the individual setting items other than the selected setting item among the jobs in ascending or descending order before sorting, in the case where the setting values of the selected setting item on the job list are sorted. The conventional sort setting corresponds to the second sort setting with which the sorting processing is solely performed for the setting values of the selected setting item.

When the print data generation unit 106 receives the print setting by the user, the print data generation unit 106 converts image data of bitmap or other form into multi-valued data of KCMY (black, cyan, magenta, and yellow). Then, the image data on which data conversion has been performed is compressed by a data compression unit that can be configured by a printer driver so as to generate print data. The data compression can be performed using a common compression method such as MH, JBIG, and LZH.

The communication unit 108 controls communication with the printer 200 through the network 10. In the present embodiment, the communication unit 108 transmits the print data generated by the print data generation unit 106 and a print job generated by the job management unit 110 to the print server 300 through the network 10. When the input receiver 104 receives the print instruction, the communication unit 108 transmits the print instruction to the printer 200.

When the input receiver 104 receives selection of the setting item on the job list, the communication unit 108 acquires the setting values of the selected setting item from the print server 300.

When the print setting by the user is received, the job management unit 110 generates the print job and stores the job list indicating the generated print job in a manner corresponding to the respective setting items in the storage unit 130. When selection of the setting item from the job list by the user is received, the job management unit 110 stores the arrangement orders of the setting values of the individual setting items among the jobs on the displayed job list in the storage unit 130.

When selection of the setting item from the job list by the user is received and the job management unit 110 stores the arrangement orders of the setting values of the individual setting items among the jobs on the job list, the sorting unit 112 sorts (rearranges) the print jobs such that the setting values of the selected setting item are arranged in the predetermined order.

To be specific, the sorting unit 112 determines whether the setting values of the selected setting item are arranged in descending order, in ascending order, or in an irregular manner, which is neither in ascending order nor in descending order. When the setting values of the selected setting item are arranged in descending order, the sorting unit 112 rearranges the print jobs such that the setting values of the selected setting item are arranged in ascending order while keeping the arrangement orders of the setting values of the setting items other than the selected setting item among the jobs in ascending or descending order as stored in the storage unit 130.

When the setting values of the selected setting item are arranged in ascending order, the sorting unit 112 rearranges the print jobs such that the setting values of the selected setting item are arranged in descending order while keeping the arrangement orders of the setting values of the setting items other than the selected setting item among the jobs in ascending or descending order as stored in the storage unit 130.

When the setting values of the selected setting item are arranged in the irregular manner, which is neither in ascending order nor in descending order, the sorting unit 112 rearranges the print jobs such that the setting values of the selected setting item are arranged in ascending order while keeping the arrangement orders of the setting values of the setting items other than the selected setting item among the jobs in ascending or descending order as stored in the storage unit 130.

When the input receiver 104 receives selection of the first sort setting, the sorting unit 112 sorts the setting values of the selected setting item while keeping the arrangement orders of the setting values of the individual setting items other than the selected setting item among the jobs in ascending or descending order as stored in the storage unit 130 as described above. By contrast, when the input receiver 104 receives selection of the second sort setting, the sorting unit 112 sorts the setting values of the setting item without keeping the arrangement orders of the setting values of the setting items other than the selected setting item among the jobs in ascending or descending order as stored in the storage unit 130.

Figure 4:
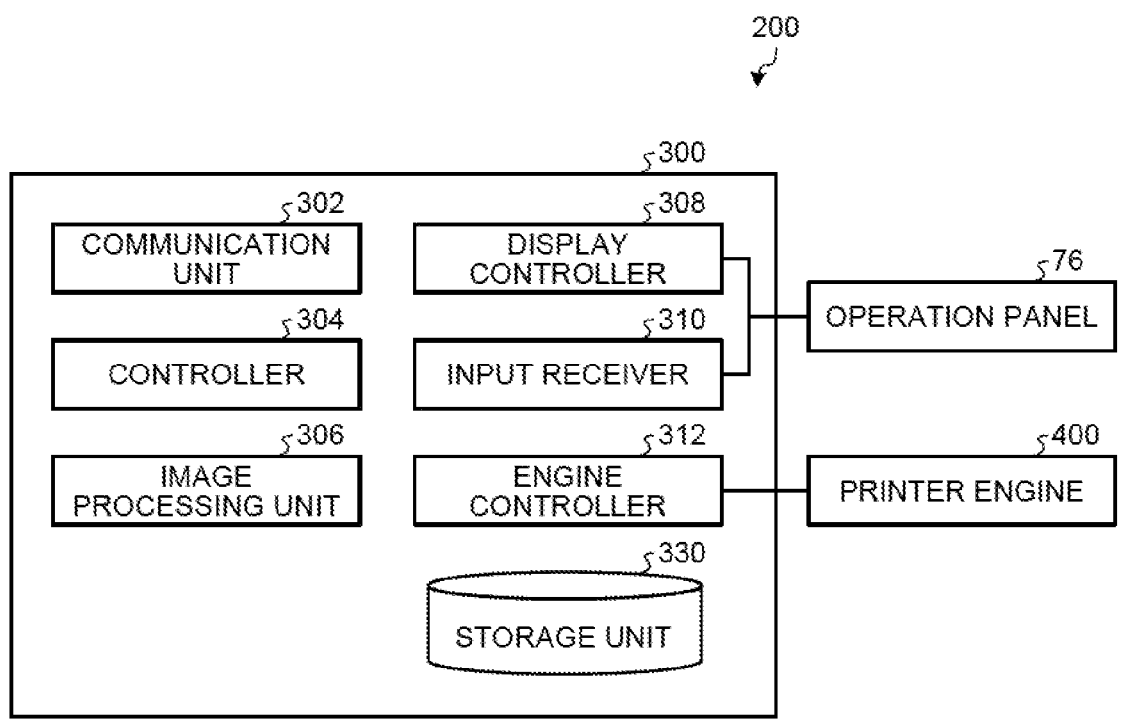
FIG. 4 is a diagram illustrating the functional configuration of a printer in the first embodiment.

Next, the configuration of the printer 200 will be described. FIG. 4 is a diagram illustrating the functional configuration of the printer in the first embodiment. As illustrated in FIG. 4, the printer 200 includes the print server 300 and the printer engine 400. The print server 300 mainly includes a storage unit 330, a communication unit 302, a controller 304, an image processing unit 306, display controller 308, an input receiver 310, and an engine controller 312, and an operation panel 76 and the printer engine 400 are connected to the print server 300.

The storage unit 330 is a storage medium storing therein pieces of data of various types such as the print data and the print job received from the PC 100. The print data has large capacity, and the storage unit 330 therefore has large capacity preferably and is a HDD normally.

The communication unit 302 controls communication with the PC 100 through the network 10. In the present embodiment, the communication unit 302 receives the print data and the print job from the PC 100. The communication unit 302 receives the print instruction from the PC 100.

When the communication unit 302 receives the print instruction, the controller 304 reads print data indicated by the print instruction from the storage unit 330.

The print data read by the controller 304 has been compressed and the image processing unit 306 therefore decompresses the read print data and performs image processing necessary for printing, such as dithering processing, so as to convert the print data into print data of colors of KCMY.

The display controller 308 performs control to display screens of various types and other functions, on the operation panel 76. The input receiver 310 receives input by the user through the displayed screens of various types or operations keys.

When the communication unit 302 receives the print instruction, the engine controller 312 transmits the print data on which the image processing unit 306 has performed the image processing to the printer engine 400 and the printer engine 400 prints the print data.

Figure 14:
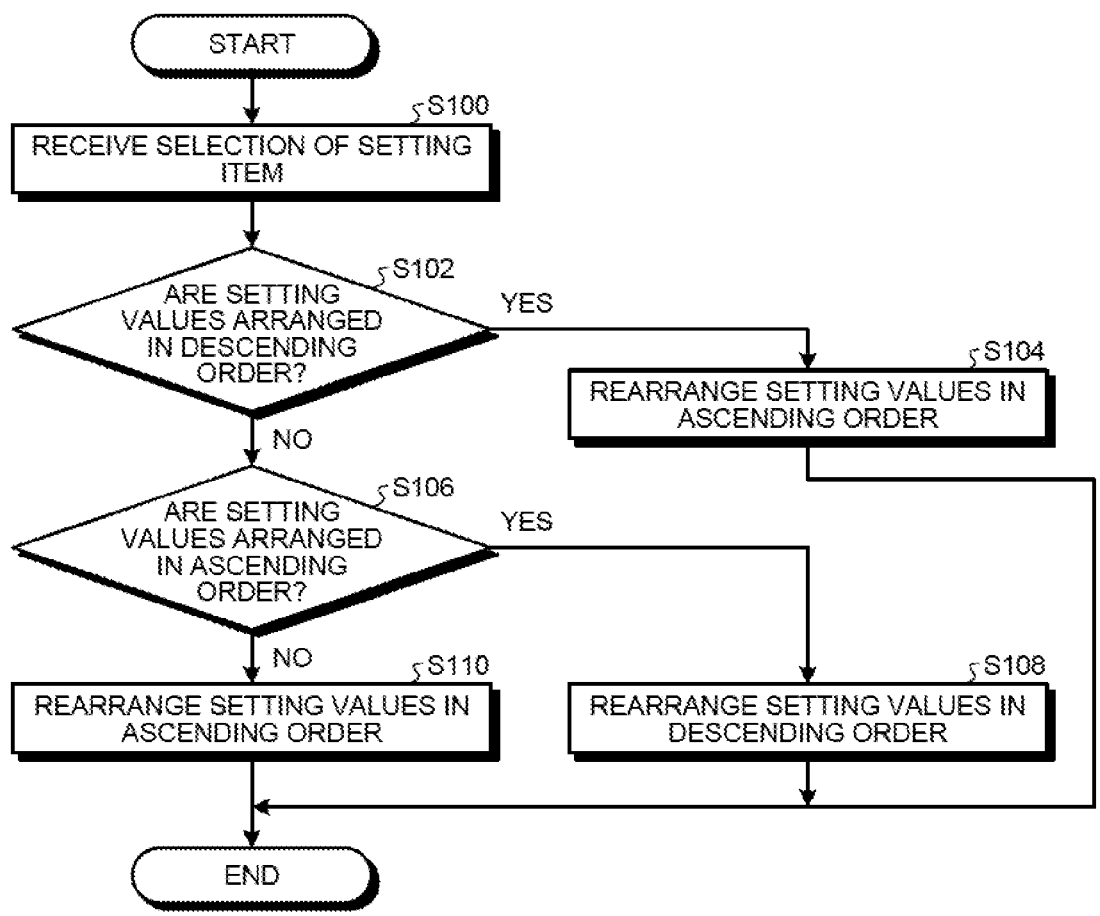
FIG. 14 is a flowchart illustrating the procedure of sorting processing in a conventional PC.

The procedure of sorting processing in a conventional PC will be described. FIG. 14 is a flowchart illustrating the procedure of the sorting processing in the conventional PC.

First, the display controller 102 performs control to display a job list on the display unit 150. When the input receiver 104 receives selection of a setting item by which the sorting processing is performed from the job list, by the user (step S100), the sorting processing is started. For example, the user can select the setting item as a sorting target by clicking an upper portion of the setting item (column) by which the user desires to perform sorting on the job list. Alternatively, the user may select the setting item as the sorting target when executing the sorting processing from a menu.

When the setting item as the sorting target is selected, the sorting unit 112 determines whether setting values of the selected setting item are arranged in descending order (step S102). When the setting values are arranged in descending order (Yes at step S102), the sorting unit 112 rearranges the print jobs such that the setting values of the selected setting item are arranged in ascending order (step S104) and finishes the processing.

By contrast, when the setting values are not arranged in descending order (No at step S102, the sorting unit 112 determines whether the setting values of the selected setting item are arranged in ascending order (step S106). When the setting values are arranged in ascending order (Yes at step S106), the sorting unit 112 rearranges the print jobs such that the setting values of the selected setting item are arranged in descending order (step S108) and finishes the processing.

By contrast, when the setting values are not arranged in ascending order (No at step S106), that is, when the setting values are arranged in an irregular manner, which is neither in ascending order nor in descending order, the sorting unit 112 rearranges the print jobs such that the setting values of the selected setting item are arranged in ascending order (step S110) and finishes the processing. Although the print jobs are rearranged such that the setting values of the selected setting item are arranged in ascending order when the setting values are arranged neither in ascending order nor in descending order (arranged irregularly) at step S110, the print jobs may be rearranged such that they are arranged in descending order.

Figure 5:
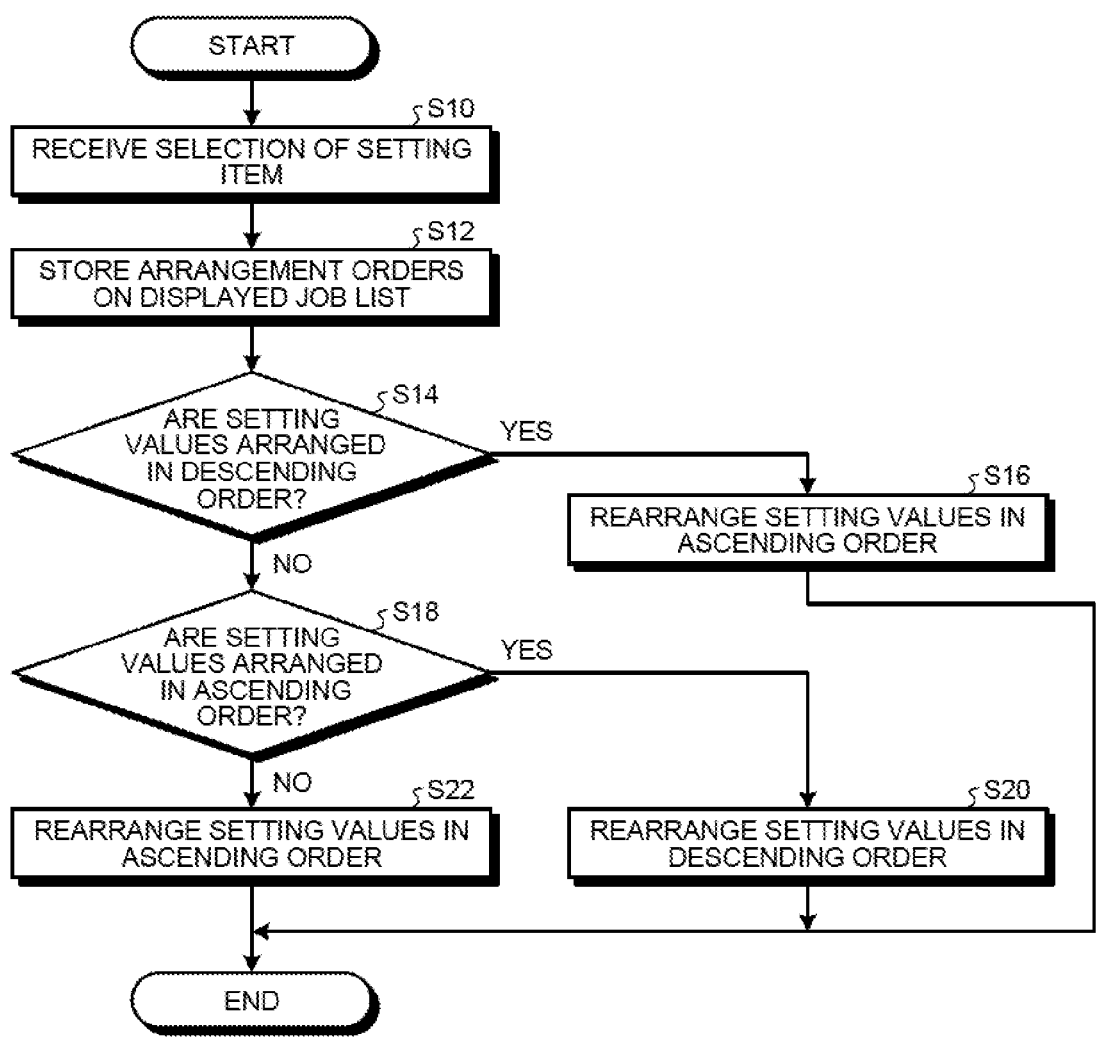
FIG. 5 is a flowchart illustrating the procedure of sorting processing in the PC in the first embodiment.

Next, the procedure of sorting processing in the PC 100 in the present embodiment will be described. FIG. 5 is a flowchart illustrating the procedure of the sorting processing in the PC in the first embodiment.

First, the display controller 102 performs control to display a job list on the display unit 150. When the input receiver 104 receives selection of a setting item by which the sorting processing is performed from the job list by the user (step S10), the sorting processing is started. For example, the user can select the setting item as a sorting target by clicking an upper portion of the setting item (column) by which the user desires to perform sorting on the job list. Alternatively, the user may select the setting item as the sorting target when executing the sorting processing from a menu.

When the setting item is selected, the sorting unit 112 stores the arrangement orders of setting values of individual setting items among jobs on the job list that is displayed on the display unit 150 in the storage unit 130 (step S12).

Subsequently, the sorting unit 112 determines whether setting values of the selected setting item are arranged in descending order (step S14). When the setting values are arranged in descending order (Yes at step S14), the sorting unit 112 rearranges the print jobs such that the setting values of the selected setting item are arranged in ascending order (step S16) and finishes the processing.

In this case, the sorting unit 112 refers to the arrangement orders of the setting values of the individual setting items among the jobs on the job list that has been stored in the storage unit 130 at step S12 and rearranges the print jobs such that the setting values of the selected setting item are arranged in ascending order while keeping the arrangement orders of the setting values of the individual setting items other than the selected setting item among the jobs in ascending or descending order as stored.

By contrast, when the setting values are not arranged in descending order (No at step S14), she sorting unit 112 determines whether the setting values of the selected setting item are arranged in ascending order (step S18). When the setting values are arranged in ascending order (Yes at step S18), the sorting unit 112 rearranges the print jobs such that the setting values of the selected setting item are arranged in descending order (step S20) and finishes the processing.

In this case, the sorting unit 112 refers to the arrangement orders of the setting values of the individual setting items among the jobs on the job list that has been stored in the storage unit 130 and rearranges the print jobs such that the setting values of the selected setting item are arranged in descending order while keeping the arrangement orders of the setting values of the individual setting items other than the selected setting item among the jobs in ascending or descending order as stored in the same manner as that at step S16.

By contrast, when the setting values are not arranged in ascending order (No at step S18), that is, when the setting values are arranged in an irregular manner, which is neither in ascending order nor in descending order, the sorting unit 112 rearranges the print jobs such that the setting values of the selected setting item are arranged in ascending order (step S22) and finishes the processing.

In this case, the sorting unit 112 refers to the arrangement orders of the setting values of the individual setting items among the jobs on the job list that has been stored in the storage unit 130 and rearranges the print jobs such that the setting values of the selected setting item are arranged in ascending order while keeping the arrangement orders of the setting values of the individual setting items other than the selected setting item among the jobs in ascending or descending order as stored in the same manner as that at step S16.

Although the print jobs are rearranged such that the setting values of the selected setting item are arranged in ascending order when the setting values are arranged neither in ascending order nor in descending order (arranged irregularly) at step S22, the print jobs may be rearranged such that they are arranged in descending order.

Desired print jobs can thus be narrowed down by selecting the job name, the user name, the size, the number of pages, and other items as the setting items, for example, and performing the sorting processing successively (successive sorting processing). The job list in the successive sorting processing will be described below.

When the arrangement orders of the setting values of the individual setting items among the jobs on the job list are stored in the storage unit 130 and the sorting processing by the first sort setting is performed by "Job Name (job name)" in a state where the job list as illustrated in FIG. 3 is displayed on the display unit 150, a job list as illustrated in FIG. 6 is provided. FIG. 6 is a diagram illustrating an example of the job list sorted by "Job Name (job name)".

When the arrangement orders of the setting values of the individual setting items among the jobs on the job list are stored in the storage unit 130 and the sorting processing by the first sort setting is performed by "User Name (user name)" in the state where the job list as illustrated in FIG. 3 is displayed on the display unit 150, a job list as illustrated in FIG. 7 is provided. FIG. 7 is a diagram illustrating an example of the job list sorted by "User Name (user name)".

When the arrangement orders of the setting values of the individual setting items among the jobs on the job list are stored in the storage unit 130 and the sorting processing by the first sort setting is performed by "Job Name (job name)" in the state where the job list as illustrated in FIG. 7 is displayed on the display unit 150, a job list as illustrated in FIG. 8 is provided. FIG. 8 is a diagram illustrating an example of the job list sorted by "User Name (user name)" and "job Name (job name)".

The case where a print job having a job name "Cat" and a user name "Mike" is found when the job list as illustrated in FIG. 3 is displayed on the display unit 150 will be described as an example. As described above, on the job list in FIG. 3, the print jobs are arranged from top to bottom in descending order of the date and time at which the print instruction has been issued ("Date/Time").

When the sorting processing by the first sort setting is performed by "Job Name (job name)" on the job list as illustrated in FIG. 3, the arrangement orders of the setting values of the individual setting items among the jobs on the job list as illustrated in FIG. 3 are stored in the storage unit 130, first. Then, when the sorting processing by the first sort setting is performed by "Job Name (job name)" so as to rearrange the print jobs, the job list as illustrated in FIG. 6 is provided. On the job list as illustrated in FIG. 6, the setting values of "User Name (user name)" are arranged irregularly although the setting values of the date and time ("Date/Time") at which the print instruction has been issued are arranged in descending order. To be specific, for the job name "Cat" on the job list as illustrated in FIG. 6, the user names that are used for finding the print job are arranged irregularly although the setting values of the date and time ("Date/Time") are arranged in descending order. When the number of print jobs corresponding to the job name "Cat" is large, it is difficult to find the print job corresponding to the desired user name "Mike" from the print jobs.

In order to overcome this difficulty, the sorting processing by the first sort setting is once performed by "User Name (user name)" that is used for finding the print job on the job list as illustrated in FIG. 3. In this case, first, the arrangement orders of the setting values of the individual setting items among the jobs on the job list as illustrated in FIG. 3 are stored in the storage unit 130. Then, when the sorting processing by the first sort setting is performed by "User Name (user name)" so as to rearrange the print jobs, the job list as illustrated in FIG. 7 is provided. With this sorting processing, the user names are rearranged in ascending order on the job list as illustrated in FIG. 7.

Thereafter, the sorting processing by the first sort setting is performed by "Job Name (job name)" that is used for finding the print job on the job list as illustrated in FIG. 7 in the same manner. In this case, first, the arrangement orders of the setting values of the individual setting items among the jobs on the job list as illustrated in FIG. 7 are stored in the storage unit 130, that is, the arrangement orders in which the setting values of the user name are arranged in ascending order are stored. Then, when the sorting processing by the first sort setting is performed by "Job Name (job name)", when the sorting processing by the first sort setting is performed so as to rearrange the print jobs while keeping the arrangement order of the user names that have been previously rearranged in ascending order, the job list as illustrated in FIG. 8 is provided. That is to say, in FIG. 8, the sorting processing of arrangement by "Job Name (job name)" in ascending order is performed while keeping the arrangement order of "User Name (user name)" in ascending order. To be specific, the user names are arranged in the order of "Ken", "Mike", "Ron", and "Vivian" in ascending order for the job name "Cat" on the job list as illustrated in FIG. 8. On the job list, even when the number of print jobs corresponding to the target job name "Cat" or the number of print jobs corresponding to the user name "Mike" is large, it is easy for the user to find the desired print job by finding the job name "Cat" on the job list in which the job names are arranged in ascending order, and then, finding the user name "Mike" from the user names arranged in the ascending order among the print jobs corresponding to the job name "Cat".

The case where the sorting processing of narrowing down the print jobs as described above (sorting processing by the first sort setting in which the arrangement orders of the setting values among the jobs before rearrangement are stored) is not necessary can be considered depending on situations. For this reason, the configuration in which setting of the sorting method is received when the sorting processing is started may be employed.

To be specific, for example, before receiving selection of the setting item, the input receiver 104 receives one of the first sort setting of keeping the arrangement orders of the setting values of the individual setting items other than the selected setting item among the jobs in ascending or descending order before sort and the second sort setting of sorting the setting values of the selected setting item without keeping the arrangement orders of the setting values of the individual setting items other than the selected setting item among the jobs in ascending or descending order before sorting. When the input receiver 104 receives the first sort setting, the sorting processing (see FIG. 5) in the present embodiment is executed whereas when the input receiver 104 receives the second sort setting, the conventional sorting processing (see FIG. 14) is executed.

As described above, in the image formation system in the present embodiment, when the sorting processing is performed by the setting item selected from the job list displayed on the PC 100, the sorting processing is performed after the arrangement orders of the setting values of the individual setting items among the jobs on the displayed job list are stored. In the image formation system in the present embodiment, the print jobs are rearranged such that the setting values of the selected setting item are arranged in the predetermined order (ascending order, descending order, or other types of orders) while keeping the arrangement orders of the setting values of the individual setting items other than the selected setting item among the jobs in ascending or descending order before sorting with reference to the arrangement orders of the setting values of the individual setting items among the jobs on the job list as stored before sorting. The print jobs can be narrowed down by performing the sorting processing successively by a plurality of setting items on the job list. The image formation system therefore enables easy specification of a desired print job, thereby improving convenience.

Second Embodiment

In the image formation system in the first embodiment, when the sorting processing is performed by the setting item selected from the job list displayed on the PC 100, the sorting processing is performed while keeping the arrangement orders of the setting values of the individual setting items other than the selected setting item among the jobs in ascending or descending order before sorting. In a second embodiment, when a large number of setting items are present and thus cannot be displayed on the display unit all at once, a setting item dedicated for the sorting processing is further provided so as to perform the sorting processing by a setting item that is not displayed.

First, display/non-display of a setting item on a conventional job list will be described. FIG. 15 is a diagram illustrating an example of the job list that is displayed on the conventional PC. As illustrated in FIG. 15, on the conventional job list, "Job Name (job name)", "User Name (user name)", "Pages (the number of pages)", "Copies (the number of print copies)", "Date/Time (date and time at which a print instruction has been issued)", and other items as the setting items of print jobs are displayed and setting values are displayed for each of the setting items.

When right-click is made on the setting item, a menu M1 for setting whether the setting items are displayed is displayed, and display or non-display (ON (display)/OFF (non-display) of the setting items can be set. To be specific, as illustrated in FIG. 15, for example, the setting item is displayed (ON) when checked on the menu M1 whereas the setting item is not displayed (OFF) when unchecked on the menu M1. In FIG. 15, "Size (size)" is unchecked and the setting item of "Size (size)" is not therefore displayed unlike in FIG. 3.

In the case where the sorting processing is performed by various setting items on the job list, when all the setting items by which the sorting processing is desired to be performed are displayed, the job list is laterally elongated and cannot be displayed on the display unit 150 all at once. In this case, the user has to find the setting item by which the user desires to perform the sorting processing by scrolling the displayed job list. That is to say, in order to perform the sorting processing for finding the desired print job, the user has to find the setting item for performing the sorting processing before the sorting processing. This requires double labor, resulting in deterioration of convenience. In the present embodiment, in order to avoid the double labor, a setting item dedicated for the sorting processing is provided.

The entire configuration of the image formation system, the configuration of the PC, and the configuration of the printer in the present embodiment are the same as those in the first embodiment (see FIGS. 1, 2, and 4) and only functions that are added in the PC 100 are therefore described.

The display controller 102 performs control to display, on the display unit 150, a job list formed by adding a variable setting item which is a setting item whose contents can be changed, in addition to the functions in the first embodiment. When the input receiver 104 receives selection of the setting item as the variable setting item, the display controller 102 performs control to display setting values of the selected setting item as setting values of the variable setting item.

The input receiver 104 receives selection of the setting item whose setting values are displayed on a column of setting values of the variable setting item and by which the user desires to perform the sorting processing from the job list formed by adding the variable, in addition to the functions in the first embodiment.

When selection of the setting item as the variable setting item on the job list by the user is received, the sorting unit 112 sorts (rearranges) the print jobs such that the setting values of the selected setting item, that is, the setting values of the variable setting item are arranged in the predetermined order, in addition to the functions in the first embodiment.

The job list formed by adding the variable setting item will be described. FIG. 9 is a diagram illustrating an example of the job list that is displayed on the PC in the second embodiment. As illustrated in FIG. 9, on the job list in the present embodiment, "Job Name (job name)", "User Name (user name)", "Pages (the number of pages)", "Copies (the number of print copies)", "Date/Time (date and time at which a print instruction has been issued)", "Sort", and other items as the setting items of print jobs are displayed and setting values are displayed for each of the setting items other than "Sort".

"Sort" as the variable setting item that is displayed on the job list in FIG. 9 indicates the setting item by which the sorting processing is performed and can be changed. When the user makes right-click on the variable setting item of "Sort" on the job list, a menu M2 for setting whether the setting items are to be displayed is displayed. Furthermore, an option of "Sort." is also displayed on the menu M2. When the user selects "Sort", a menu M3 for selecting a setting item by which the sorting processing is performed is displayed. When the user selects the setting item by which the sorting processing is performed, setting values of the selected setting item are displayed for the setting item of "Sort" and the sorting processing is performed by the setting item. Although one variable, setting item is provided on the job list in FIG. 9, two or more variable setting items may be provided.

Figure 10:
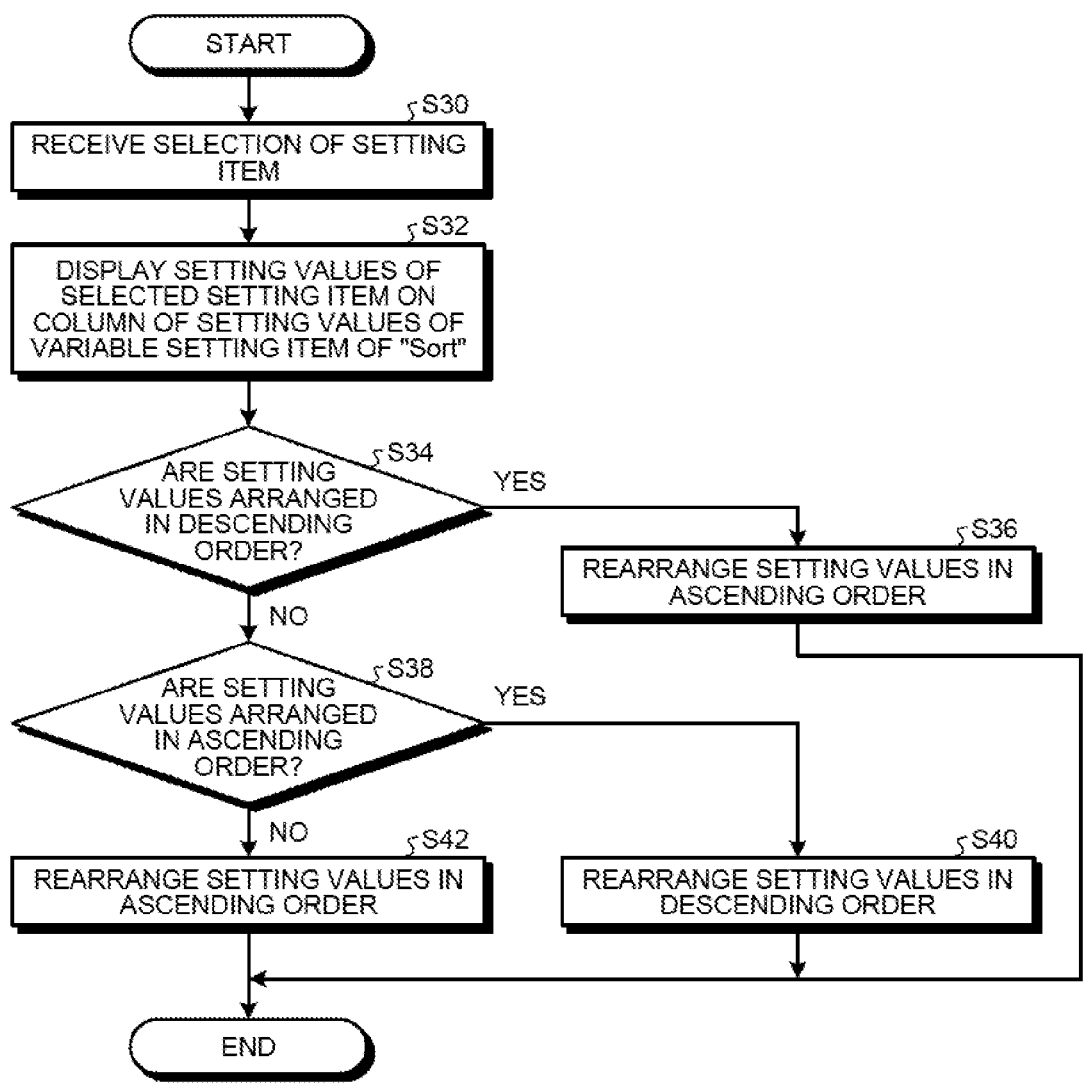
FIG. 10 is a flowchart illustrating the procedure of sorting processing in the PC in the second embodiment.

Next, the procedure of the sorting processing in the PC 100 in the present embodiment will be described. FIG. 10 is a flowchart illustrating the procedure of the sorting processing in the PC in the second embodiment.

First, the display controller 102 performs control to display a job list on the display unit 150. When the input receiver 104 receives right-click by the user on the variable setting item of "Sort" on the job list, the menu M2 is displayed. Furthermore, when the input receiver 104 receives selection of an option of "Sort" and selection of a setting item by which the sorting processing is performed (step S30), the sorting processing is started.

Then, the display controller 102 performs control to display the selected setting item on the variable setting item of "Sort" and display setting values of the selected setting item on a column of setting values of the variable setting item (step S32).

When the setting item is selected, the sorting unit 112 determines whether the setting values of the selected setting item are arranged in descending order (step S34). When the setting values are arranged in descending order (Yes at step S34), the sorting unit 112 rearranges the setting values of the selected setting item in ascending order (step S36) and finishes the processing.

By contrast, when the setting values are not arranged in descending order (No at step S34), the sorting unit 112 determines whether the setting values of the selected setting item are arranged in ascending order (step S38). When the setting values are arranged in ascending order (Yes at step S38), the sorting unit 112 rearranges the setting values of the selected setting item in descending order (step S40) and finishes the processing.

By contrast, when the setting values are not arranged in ascending order (No at step S38), that is, when the setting values are arranged in an irregular manner, which is neither in ascending order nor in descending order, the sorting unit 112 rearranges the setting values of the selected setting item in ascending order (step S42) and finishes the processing. Although the setting values of the selected setting item are rearranged in ascending order when the setting values are neither in ascending order nor in descending order (arranged irregularly) at step S42, the setting values may be rearranged in descending order.

As described above, in the image formation system in the second embodiment, the setting values of the selected setting item are displayed on a column of setting values of the variable setting item on the job list displayed on the PC 100 and the sorting processing is performed by the selected setting item. That is to say, the sorting processing can be performed while displaying a desired setting item on a column of the variable setting item. Accordingly, even when a large number of setting items are present and cannot be displayed on the display unit all at once, the user does not have to find the setting item by which the user desires to perform the sorting processing by scrolling the job list and the sorting processing by various setting items can be performed in one screen, thereby improving the convenience.

When the sorting processing is performed in the image formation system in the second embodiment, the sorting processing in the first embodiment may be combined. That is to say, the arrangement orders of the setting items on the displayed job list may be stored before the sorting processing using the variable setting item is performed, and when the setting values of the selected setting item are sorted, the sorting processing may be performed while keeping the arrangement orders of the setting values of the individual setting items other than the selected setting item among the jobs in ascending or descending order as stored.

Third Embodiment

In the image formation system in the first embodiment, when the sorting processing is performed by the setting item selected from the job list displayed on the PC 100, the sorting processing is performed while keeping the arrangement orders of the setting values of the individual setting items other than the selected setting item among the jobs in ascending or descending order before sorting. In a third embodiment, whether a print job has a desired setting value can be easily checked among a plurality of print jobs.

The user operates client software for the PC 100 and transmits a print file containing print data of a post script (PS), a portable document format (PDF), or the like to the print server 300. Thereafter, the user changes print setting if necessary and executes printing. In the recent printing industry, a plurality of jobs are desired to be printed with the same setting in many cases. In this case, checking of settings of the individual setting items by opening setting screens (property) of the print jobs one by one takes lots of work. In order to address this, in the third embodiment, print jobs having the same setting values among the plurality of jobs are displayed in the same colors.

The entire configuration of the image formation system, the configuration of the PC, and the configuration of the printer in the present embodiment are the same as those in the first embodiment (see FIGS. 1, 2, and 4) and only functions that are added in the PC 100 are therefore described.

The input receiver 104 receives selection of plurality of print jobs from the job list that is displayed on the display unit 150 by the display controller 102, in addition to the functions in the first embodiment.

When the input receiver 104 receives the selection of a plurality of print jobs, the display controller 102 performs control to emphatically display print jobs having setting values all of which are the same in the same colors and emphatically display print jobs having different setting values in different colors among the selected print jobs, in addition to the functions in the first embodiment. It is sufficient that the emphatic display is made so as to visually distinguish the corresponding print jobs from other print jobs. In the present embodiment, highlight display is employed as an example of the emphatic display.

Figure 11:
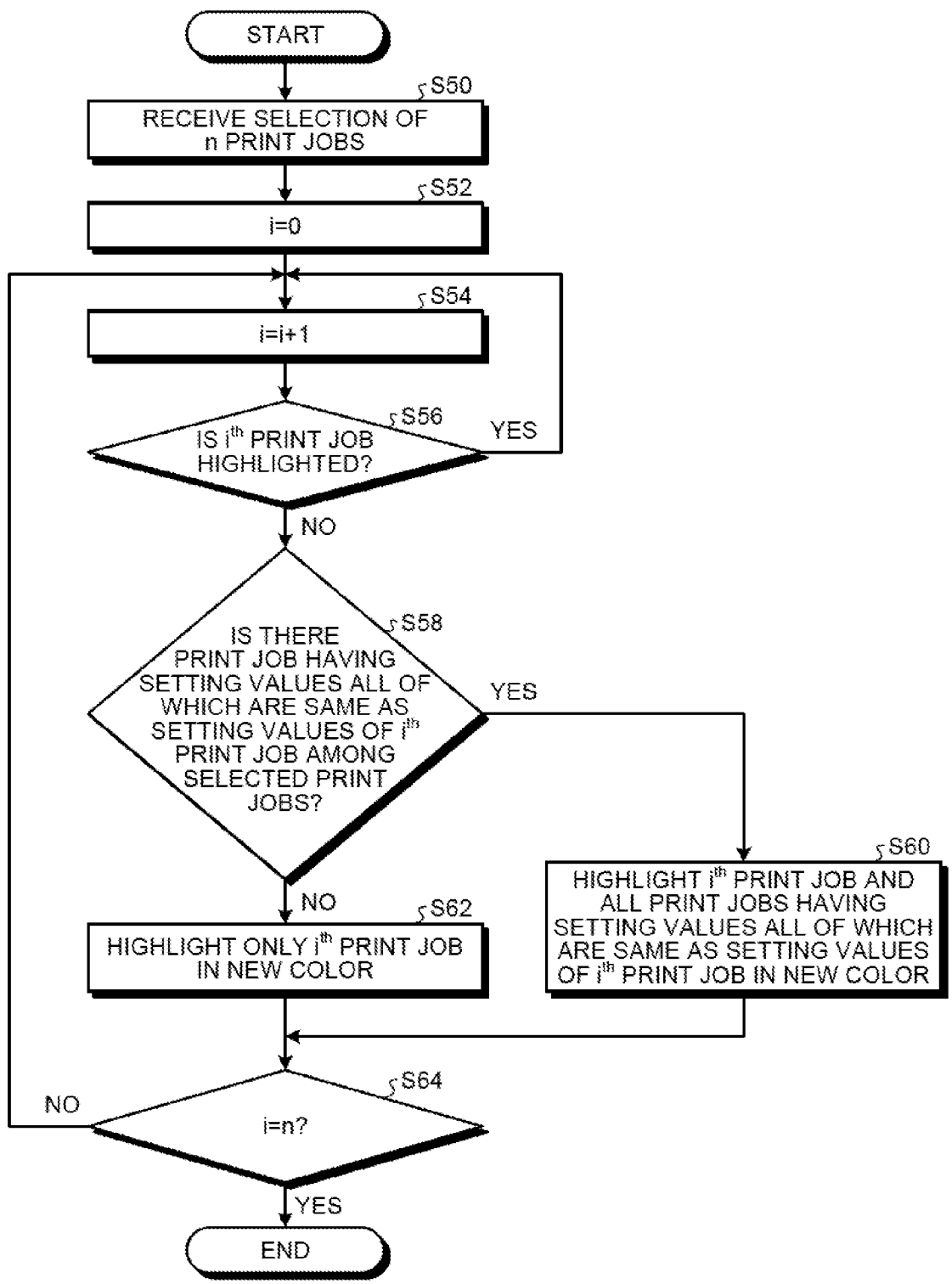
FIG. 11 is a flowchart illustrating the procedure of display processing in a PC according to a third embodiment.

Next, the procedure of display processing in the PC 100 in the present embodiment will be described. FIG. 11 is a flowchart illustrating the procedure of the display processing in the PC in the third embodiment.

First, the display controller 102 performs control to display a job list on the display unit 150. The input receiver 104 receives selection of n (a plurality of) print jobs from the job list (step S50). Then, setting values of the print jobs among the selected n print jobs are compared sequentially.

In FIG. 11, setting values of the ith print job and setting values of other print jobs are compared. First, starting from i=0 (step S52), comparison is made for the ith (i=i+1) print job that is incremented by 1 while a value calculated by adding 1 to i is assumed to i (step. S54).

The display controller 102 determines whether the ith print job is highlighted (step S56). When the ith print job is highlighted (Yes at step S50, the process returns to step S54 and the display controller 102 increments i by 1 (step S54) and proceeds to step S56.

By contrast, when the ith print job is not highlighted (No at step S56), the display controller 102 determines whether there is a print job having setting values all of which are the same as the setting values of the ith print job among the selected n print jobs (step S58).

When there is the print job having the setting values all of which are the same as the setting values of the ith print job (Yes at step S58), the display controller 102 highlights the ith print job and all the print jobs having the setting values all of which are the same as the setting values of the ith print job in a new color (step S60).

By contrast, when there is no print job having the setting values all of which are the same as the setting values of the ith print job (No at step S58), the display controller 102 highlights only the ith print job in a new color (step S62).

Then, the display controller 102 determines whether the ith print job is an nth print job (i=n?) (step S64). That is to say, the display controller 102 determines whether comparison has been made for all the 1st to nth print jobs. When the ith print job is not the nth print job (No at step S64), the process returns to step S54 and the display controller 102 increments i by 1 (step S54) and proceeds to step S56 again.

By contrast, when the ith print job is the nth print job (Yes at step S64), the processing is finished. Set items on the job list that do not influence, a print result, such as the file name and the user name, may be considered to be out of determination targets and may not be highlighted.

Thus, in the image formation system in the third embodiment, when a plurality of print jobs are selected from the job list that is displayed on the PC 100, print jobs having setting values all of which are the same among the print jobs are highlighted. With the highlight display, the print jobs having the same setting values among the selected print jobs can be grasped at a glance, thereby improving convenience.

There are some client software for the PC 100 by which changes in print settings at a time by selecting a plurality of print jobs are not allowed. In this case, settings are made for the print jobs to be printed by opening the setting screens (property) one by one. The user possibly makes a mistake in the settings in this case. Use of the image formation system in the present embodiment enables the user to grasp the print jobs having the same setting values at a glance and also check the print settings.

The highlight display in the image formation system in the third embodiment may be combined with the sorting processing in the first embodiment and the second embodiment. That is to say, the arrangement orders of the setting items on the displayed job list are stored before the sorting processing using the variable setting item is performed and the sorting processing is performed while keeping the arrangement orders of the setting values of the individual setting items other than the selected setting item among the jobs in ascending or descending order as stored when the setting values of the selected setting item are sorted. Thereafter, when a plurality of print jobs are selected, print jobs having setting values all of which are the same among the print jobs are highlighted. With this processing, the setting item of the print job is easily found from the job list for the sorting processing, and the sorting processing is performed successively so as to specify a desired print job easily. Furthermore, the print setting can be changed for printing if necessary. In addition, the print settings of the print jobs can be checked easily with the print jobs that are highlighted, thereby improving convenience.

Figure 12:
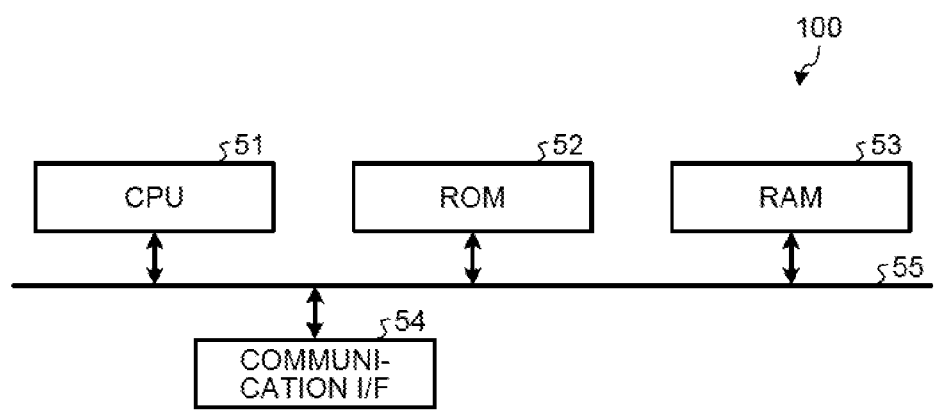
FIG. 12 is a descriptive diagram for explaining the hardware configuration of the PC in the first to the third embodiments.

Next, the hardware configuration of the PC 100 in the first to the third embodiments will be described with reference to a drawing. FIG. 12 is a descriptive diagram for explaining the hardware configuration of the PC in the first to the third embodiments.

The PC 100 in the first to the third embodiments includes a control device such as a central processing unit (CPU) 51, a storage device such as a read only memory (ROM) 52 and a random access memory (RAM) 53, a communication I/F 54 that is connected to a network for communication, an external storage device such as a and disk drive (HDD) and a compact disc (CD) drive device, a display device such as a display unit, an input device such as a keyboard and a mouse, and a bus 55 connecting the respective units, and has the hardware configuration using a common computer.

An information processing program that is executed by the PC 100 in the first to the third embodiments is recorded and provided, as a computer program product, in a computer-readable recording medium such as a compact disc read only memory (CD-ROM), a flexible disk (ED), a compact disc recordable (CD-R), and a digital versatile disc (DVD), in an installable or executable file.

The information processing program that is executed by the PC 100 in the first to the third embodiments may be stored in a computer connected to a network such as the Internet and provided by being downloaded via the network. The information processing program that is executed by the PC 100 in the first to the third embodiments may be provided or distributed via a network such as the Internet.

The information processing program in the first to the third embodiments may be embedded and provided in a ROM, for example.

The information processing program that is executed by the PC 100 in the first to the third embodiments has a module configuration including the above-mentioned units (the display controller 102, the input receiver 104, the print data generation unit 106, the communication unit 108, the job management unit 110, and the sorting unit 112). As actual hardware, the CPU 51 (processor) reads and executes the information processing program from the above-mentioned storage medium, so that the above-mentioned respective units are loaded on a main storage device to be generated on the main storage device. Furthermore, a part or all of the functions of the above-mentioned respective units may be made to operate by a dedicated hardware circuit.

Figure 13:
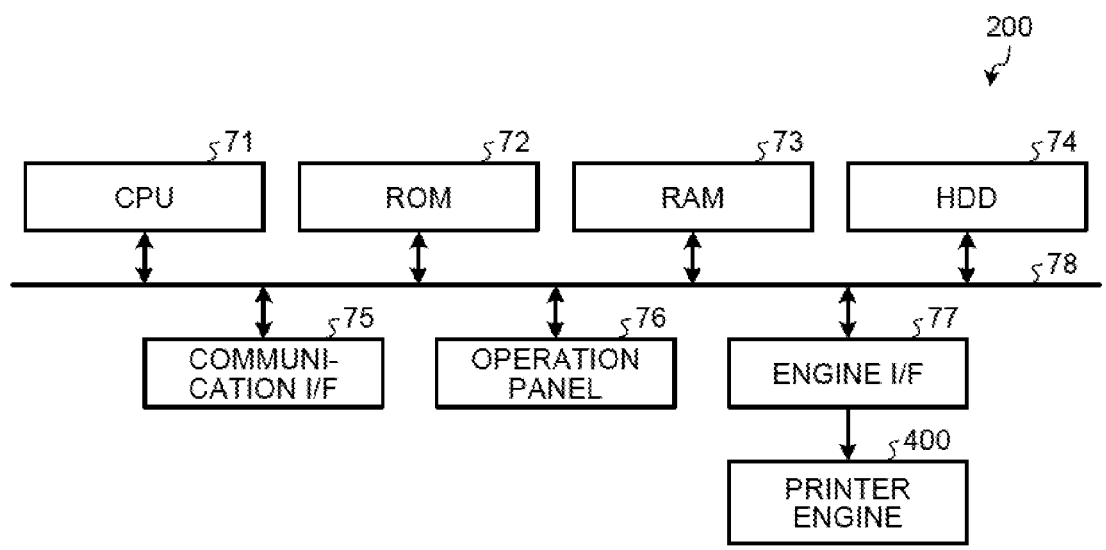
FIG. 13 is a descriptive diagram for explaining the hardware configuration of the printer in the first to the third embodiments.

Next, the hardware configuration of the printer 200 in the first to the third embodiments will be described in detail with reference to a drawing. FIG. 13 is a descriptive diagram for explaining the hardware configuration of the printer in the first to the third embodiments.

As illustrated in FIG. 13, the printer 200 includes a CPU 71, a ROM 72, a RAM 73, an HDD 74, a communication I/F 75, the operation panel 76, and an engine I/F 77, and the respective units are connected by a bus 78 in a communicable manner.

The CPU 71 is an operation device controlling operations of the entire printer 200. The ROM 72 is a non-volatile storage device that stores therein a computer program for the printer 200. The RAM 73 is a volatile storage device that is used as a work area for operation of the CPU 71. The HDD 74 is a device storing therein pieces of data of various types such as image data and print data.

The communication I/F 75 is an interface for making data communication using the network 10. The operation panel 76 is a touch panel, for example, and is a device that receives input to the printer 200 and displays a state and the like of the printer 200.

The engine I/F 77 is an interface for making communication with the printer engine 400. The printer engine 400 is a hardware device causing a scanner function, a printer function, and the like to operate. The scanner function is a function of reading document data so as to generate a scanner image. The printer function is a function of executing image processing on the above-mentioned scanner image or image data transmitted from the PC 100 and printing a plotter image in a format capable of being output on print paper.

In the above-mentioned embodiments, the image formation apparatus in the present invention is applied to the printer but can be applied to any image formation apparatus such as a multifunction peripheral having at least two functions from a copying function, a printer function, a scanner function, and a facsimile function; a copying machine; a scanner machine; and a facsimile machine.

The present invention provides an advantageous effect of easily specifying a desired job so as to improve convenience.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus that is connected to an image formation apparatus through a network, the information processing apparatus comprising:
    a storage unit;
    a display controller configured to display, on a display unit, a job list that is a list of plural jobs executable in the image formation apparatus and contains plural setting items for each of the jobs;
    an input receiver configured to receive selection of a setting item whose setting values corresponding to the respective jobs on the displayed job list are to be sorted; and
    a sorting unit configured to perform sorting processing on the displayed job list with respect to the setting item selected from the displayed job list, wherein
    when the input receiver receives selection of a first setting item, the sorting unit performs first sort processing to sort the jobs on the displayed job list by the first setting item and stores, in the storage unit, an arrangement order of setting values of the first setting item, and
    when the input receiver receives selection of a second setting item after performing the first sort processing with respect to the first setting item, the sorting unit performs second sort processing to sort the jobs on the displayed job list, on which the first sort processing has been performed, and with respect to the second setting item while keeping, for each group of jobs having the same setting value of the second setting item, the arrangement order of the setting values of the first setting item as stored in the storage unit.

2. The information processing apparatus according to claim 1, wherein
    the input receiver receives selection of one of first sort setting and second sort setting when the jobs are rearranged such that the setting values of the selected setting item are arranged in a predetermined order, the first sort setting keeping the arrangement orders of the setting values of the setting items other than the selected setting item among the jobs in ascending or descending order as stored in the storage unit, and the second sort setting not keeping the arrangement orders of the setting values of the setting items other than the selected setting item among jobs in ascending or descending order as stored in the storage unit, and
    the sorting unit keeps the arrangement orders of the setting values of the setting items other than the selected setting item among the jobs in ascending or descending order as stored in the storage unit when selection of the first sort setting is received.

3. The information processing apparatus according to claim 1, wherein
    the job list contains at least one variable setting item as the setting item whose contents are capable of being changed,
    the input receiver receives selection of the setting item as the variable setting item,
    the display controller performs control to display, on the display unit, the setting values of the selected setting item as the setting values of the variable setting item when selection of the setting item as the variable setting item is received, and
    the sorting unit rearranges the jobs such that the setting values of the variable setting item are arranged in a predetermined order.

4. The information processing apparatus according to claim 1, wherein
    the input receiver receives selection of a plurality of jobs from the displayed job list, and
    the display controller performs control to display, on the display unit, jobs having the setting values all of which are the same in the same color and display jobs having different setting values in different colors among the selected jobs when selection of the jobs is received.

5. An information processing method that is executed by an information processing apparatus connected to an image formation apparatus through a network, the information processing method comprising:
    displaying, on a display unit, a job list that is a list of plural jobs executable in the image formation apparatus and contains plural setting items for each of the jobs; and
    receiving selection of a setting item whose setting values corresponding to the respective jobs on the displayed job list are to be sorted and performing sorting processing on the displayed job list with respect to the setting item selected from the displayed job list, including (i) when selection of a first setting item is received, performing first sort processing to sort the jobs on the displayed job list by the first setting item and storing, in a storage unit, an arrangement order of setting values of the first setting item, and (ii) sorting, when selection of a second setting item is received after the first sort processing is performed with respect to the first setting item, performing second sort processing to sort the jobs on the displayed job list, on which the first sort processing has been performed, and with respect to the second setting item while keeping, for each group of jobs having the same setting value of the second setting item, the arrangement order of the setting values of the first setting item as stored in the storage unit.

6. A computer program product comprising a non-transitory computer-readable medium including programmed instructions, the instructions causing a computer to execute:
    displaying, on a display unit, a job list that is a list of plural jobs executable in the image formation apparatus and contains plural setting items for each of the jobs; and
    receiving selection of a setting item whose setting values corresponding to the respective jobs on the displayed job list are to be sorted and performing sorting processing on the displayed job list with respect to the setting item selected from the displayed job list, including (i) when selection of a first setting item is received, performing first sort processing to sort the jobs on the displayed job list by the first setting item and storing, in a storage unit, an arrangement order of setting values of the first setting item, and (ii) sorting, when selection of a second setting item is received after the first sort processing is performed with respect to the first setting item, performing second sort processing to sort the jobs on the displayed job list, on which the first sort processing has been performed, and with respect to the second setting item while keeping, for each group of jobs having the same setting value of the second setting item, the arrangement order of the setting values of the first setting item as stored in the storage unit.

* * * * *